United States Patent [19]
Faugeras et al.

[11] 3,792,479
[45] Feb. 12, 1974

[54] DEVICE FOR DETERMINING THE DIRECTION OF PROPAGATION OF A PLANE WAVE

[75] Inventors: Anne-Marie Faugeras, Paris; Andre Lambert, Fresnes, both of France

[73] Assignee: Compagnie Industrielle des Telecommunications Cit-Alcatel, Paris, France

[22] Filed: Apr. 21, 1972

[21] Appl. No.: 246,414

[30] Foreign Application Priority Data
Apr. 21, 1971 France .......................... 71.14137

[52] U.S. Cl. ............ 343/113 R, 340/6 R, 340/16 R
[51] Int. Cl. ............................................. G01s 3/00
[58] Field of Search ........ 343/113 R; 340/16 R, 6 R

[56] References Cited
UNITED STATES PATENTS
3,449,711  6/1969  Ricketts, Jr. et al. ........ 343/113 R X
3,691,514  9/1972  Goursolas et al. .......... 343/113 R X

*Primary Examiner*—Maynard R. Wilbur
*Assistant Examiner*—Richard E. Berger

[57] ABSTRACT

A device for determining the direction of propagation of a plane wave in an isotropic medium, in which the detectors are uniformly distributed on a circle. These detectors are disposed in groups each corresponding to a predetermined direction. Each detector is connected to a chain consisting of the same number of adders as detectors in a group. The adders are interconnected by shift registers.

3 Claims, 1 Drawing Figure

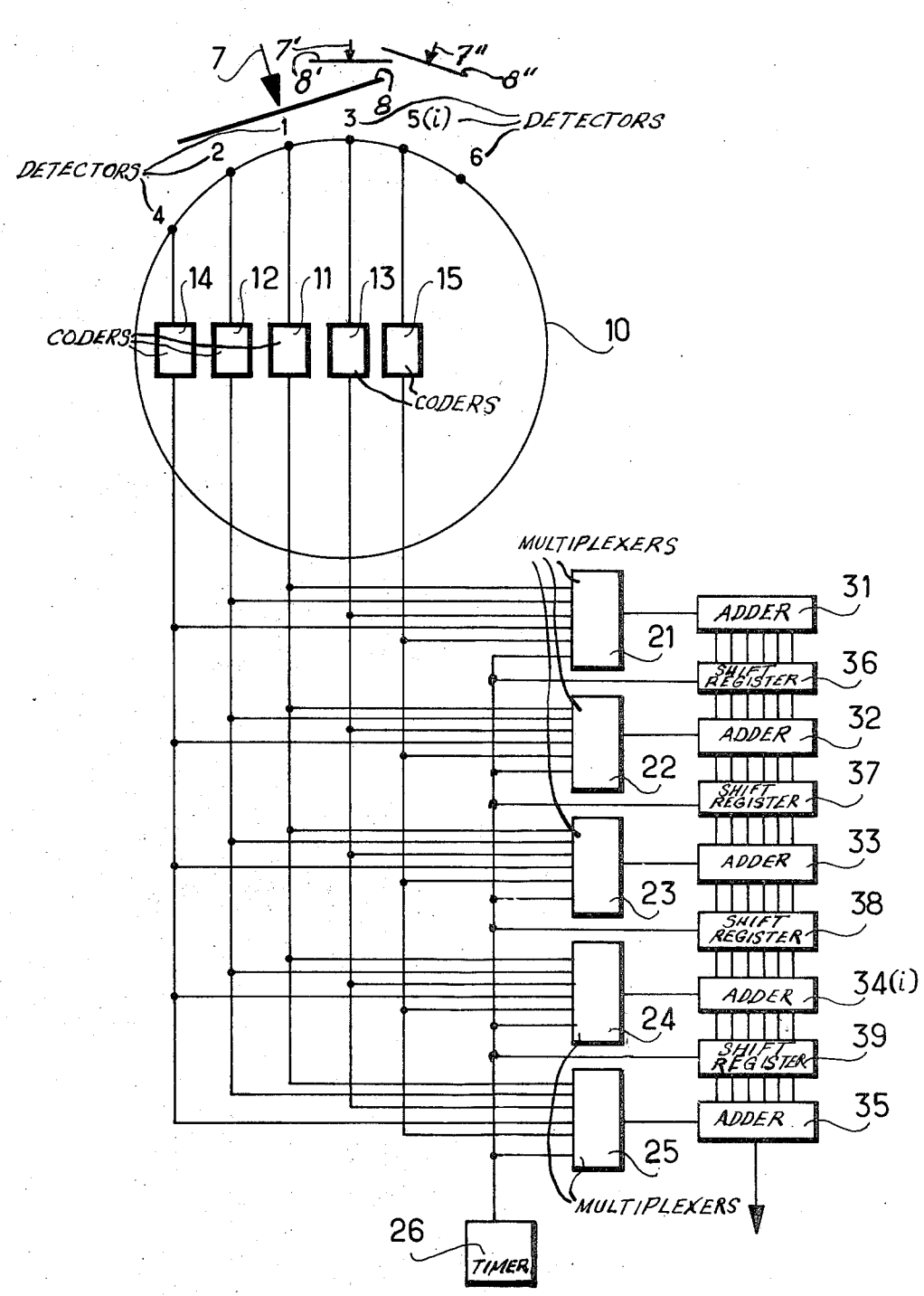

DEVICE FOR DETERMINING THE DIRECTION OF PROPAGATION OF A PLANE WAVE

The invention relates to a device for determining the direction of propagation of a plane wave comprising detectors uniformly distributed on a circle.

Numerous devices are known for determining the direction of propagation of a plane wave. In particular, in French Pat. No. 69 20 024 filed on June 16, 1969 by the "Societe Alsacienne de Constructions Atomiques de Telecommunications et d'Electronique", and corresponding to U.S. application Ser. No. 46,667 filed June 16, 1970, now U.S. Pat. No. 3,691,514, a device is described which comprises an arrangement of a number of detectors each providing a quantized signal, coded in the form of a group of binary pulses. This arrangement comprises a number of algebraic adders equal to the number of predetermined directions, logic gates, at least equal in number to the number of detectors considered for each predetermined direction, a chain of trigger circuits, and lastly a timer.

When the number of predetermined directions in which the origin of the plane wave is being sought increases in the appreciable manner, the number of adders to be implemented also increases appreciably. Each time it is wished to determine very accurately the direction from which the plane wave is coming, it is necessary to multiply the number of predetermined directions and likewise to increase the number of adders required.

We have thus been lead to study a device which continues to ensure the necessary accuracy while reducing the number of adders required. More particularly, we have examined the simplification obtained in the case of a circular arrangement of detectors uniformly distributed on a circumference. In this case all the useful directions may be studied from the same configuration of detectors. It is sufficient to examine one of them and then to effect a rotation of the direction equal to the angle at the centre of two successive detectors.

The implementation of such a device utilizing a circular arrangement of detectors may be simplified considerably if a number of considerations associated with the equipment used, which draws on adders and shift registers, are taken into account. The first remark refers to the existence of a minimum period of time $\tau$ associated with the equipment used, below which it is not possible to transmit two successive information units. It will depend, for example, on the triggering time of the shift registers or on the opening time of the gates. This period of time evolves with the development of the equipment and more particularly with the development of rapid logic circuits. At present this period of time $\tau$ is roughly between 1 and 2 microseconds.

The second remark relates to the fact that the period of time which passes between two information requests on a same line, that is, for a direction presumed to be that of the incident wave, the period of time constituting the sampling time Te doen not need to be equal to the propagation time of the wave from one end to the other of the arrangement of detectors corresponding to a line. The sampling time Te may clearly be shorter but it must obviously not be greater than $\tau$.

Considering next the M detectors which are uniformly distributed on the circumference, it will be noted that M groups of N successive detectors may be formed, each differing by one detector and corresponding to M directions.

Each detector is connected to an adder and two successive adders are interconnected by a shift register transferring in parallel the content of the first adder to the subsequent adder. Each register consists of a number of stages, in which the information only remains for a $\tau$ period of time. The unit of adders and registers together forms a chain.

When a signal is picked up by the detector which the incident wave reaches first, it is injected into the first adder. After a period of time $\tau$, it is propagated from the first adder to the first register and then to the second adder and thus step by step to the last adder. During the passage of the signal through the adder of an intermediate rank $i$ only this adder of rank $i$ is loaded by a detector which is a corresponding intermediate detector of rank $i_i$.

Thus it is considered possible to recommence the step after a sampling period Te, without risking overloading the chain. Two units of information are then being propagated along the chain. By recommencing the series of steps at each Te period there will be several units of information spaced apart within the "Te" period being propagated one behind the other along the chain without causing overloading.

Between these series of signals there are empty adders and registers which are momentarily unused. Thus after a period of time $\tau$ the first signal of a second line may be sent to the first adder and it then follows the same sequence as just discribed. After a period of time $2\tau$, the first signal of the first detector of the third line may be sent to the first adder. It will thus be possible to send a number of signals from different lines at $\tau$ periods of time to the first adder until the sampling time Te is reached. It is thus possible to insert $Te/\tau$ lines in one chain, that is, to effect steps according to $Te/\tau$ different directions.

If the number M of possible lines is lower or equal to the ratio $Te/\tau$, a single chain will suffice to handle all the lines in the system. If this is not the case, the necessary number of chains will be used (in normal cases two or three at maximum).

The device for determining the direction of propagation of a plane wave, which is the object of the present invention, consists of M detectors uniformly distributed on a circle, disposed in groups, each corresponding to a predetermined direction and comprising in addition coders quantizing the signals coming from the detectors, adders, shiftable memories and a timer, characterized in that the adders and the shiftable memories are grouped in a number of chains P in which the information progresses at a rhythm determined by the timer, each adder of each chain being connected to M/P detectors and connected to the subsequent adder of the same chain by means of a shift register.

The device thus defined, formed of M detectors uniformly distributed on a circle may comprise a single chain constituted by a number of adders and shift registers memories equal to the number of detectors grouped to form a line corresponding to a predetermined direction if the ratio between the sampling period Te and the relaxation time $\tau$ of the components of said chain is greater than the total number of detectors M. If this is not the case, two or three chains must be used. However, it is always preferable only to use one chain.

Other features and advantages will be provided by the following description of an embodiment of a device for determining the direction of propagation of a plane wave in a substantially isotropic medium, with reference to the single accompanying drawing which represents the schematic plan of a system according to the invention.

In this diagram, on a circumference 10, formed of equidistant detectors numbered 1 to 6, 5 of them form a group ($N = 5$) corresponding to the direction of propagation 7 of the plane wave 8 which is perpendicular to it. These detectors are provided with coders 11, 12, 13, 14 and 15 which transform the analogical signal provided by the detectors into a sequence of binary pulses or "words."

These pulses are transmitted to multiple gates (multiplexers) 21, 22, 23, 23 and 25 controlled by a timer 26. These multiplexers are connected to the adders 31, 32, 33, 34, and 35 connected respectively to shift registers 36, 37, 38, 39. These shift registers operate in such a manner that, for example, the register 36 effects the transfer in parallel of its contents to the adder 32 and so on.

The operation of such a device is easily explained. A group of $N = 5$ detectors corresponding to a direction "7" is formed. This constitutes a line.

When the incident wave 8 arrives at the time $t_1$, it excites the detector 1 which transmits its signal in the form of a binary value to the adder 31 via the coder 11 and by virtue of the opening of the multiple gate 21.

Between the adders 31 and 32 a delay is provided by virtue of the register 36. This delay is equal to the duration of propagation of the wave (which is supposed to be coming in the direction 7). The value of this delay may be expressed in terms of a whole number of time $\tau$ (since a very small $\tau$ is in the order of a microsecond).

The register 36 only transmits the number received by the adder 31 of the detector 1 at the time $t_2$ which corresponds to the moment when the wave, which is assumed to be propagating in the direction 7, arrives at the detector 2 so that $$t_2 - t_1 = n_{12}\,\tau$$

After a very short period of time the signal arrives in the register 36. The adder 31 is then available. After a period of time $n_{12}\,\tau$ the signal is sent to the adder 32 where it is added to the signal provided by the detector 2 which arrives at the same time. After a period of time $\tau$ the sum of these two signals is discharged from the adder 32 to come to the register 37 and so on. The adder 35 provides the total signal for this line.

After a period of time $Te =$ the sampling period, which is generally lower than $n_{51}\,\tau$, the steps are recommenced and the detector 1 once again provides the adder 31 with a new signal for the first line.

This the chain 31–35 is only partially occupied as was indicated earlier. The second line corresponding to wave 8' coming from the direction 7' is formed by the detectors 1,2,3,5,6. On referring to the drawing it will be noted that detector 3 is the first reached by the incident wave.

In view of the fact that the first adder 31 is free at the time $t_1 + \tau$, it is possible from this moment, with the aid of the multiplexer 21, to direct the coded signal from the detector 3 to the adder 31 and the signal of the second line is made to follow the same sequence along the same chain as the signal of the first line.

The same procedure will be adopted for third line corresponding to wave 8" coming from the direction 7" as soon as possible after the time $t_1 + 2$, etc. It will be noted that the importance of the new device lies in the fact that the number of adders is reduced to the number N of the detectors used for one of the directions. N may be small with respect to M.

In addition, the new device makes possible the removal of the chain of bistable trigger circuits determining the sampling periods. The new device operates permanently at a regular rhythm, the sampling times being defined by the cabling of the gates between the detectors and the adders. Finally, the units of information are discharged naturally multiplexed.

Although the device which has been described seems to be the most advantageous way of implementing the invention, it may be modified in various ways without departing from the scope of the invention. Certain elements may be replaced by other elements capable of ensuring an equivalent technical function.

More particularly, the predetermined direction may be selected in such a way that the delay of the wave presumed to be arriving in this direction, is equal to $\tau$ between certain pairs of detectors. In this case, the shift registers disposed between the adders corresponding to these pairs of detectors may be eliminated.

Likewise, when the ratio $Te/\tau$ is greater than 2M, it is possible to select the predetermined direction in such a way that the delay of the wave which is presumed to be arriving in that direction is zero between the pairs of symmetric detectors. In this case, each of the symmetric detectors is connected to the same adder. Thus a reduction in the number of adders is obtained.

We claim

1. Apparatus for determining the direction of propagation of a plane wave by detecting said plane wave in a plurality of predetermined directions uniformly distributed in a plane, said apparatus comprising:
   a. a plurality of detectors uniformly distributed on a circle and disposed in groups of consecutive detectors differing from each other by one detector, each group corresponding to a predetermined direction,
   b. a plurality of coders each connected to a corresponding detector and quantizing the signals from that detector,
   c. a plurality of adders equal in number to an integral multiple of the number of groups of detectors,
   d. a plurality of shift registers equal in number to an integral multiple of one less than the number of groups of detectors, said adders and shift registers being alternately connected into one or more chains, each adder of each chain being connected to a number of said detectors through their corresponding coders and to the subsequent adder of the same chain by means of a shift register, the number of said detectors being equal to the ratio of the number of predetermined directions and the number of chains,
   e. timing means connected to each of said shift registers for controlling the progression of information along each chain, wherein each shift register introduces a delay equal to the duration of the propagation of a wave in a predetermined direction between a detector of the group correspond-ing to the predetermined direction and a detector of the same group which is the next to be reached by the wave.

2. An apparatus according to claim 1, in which the ratio $Te/\tau$ between a sampling period Te and the relaxation period $\tau$ of the components of a chain is greater than twice the number of predetermined directions, characterized in that each pair of symmetric detectors, with respect to the predetermined direction, is connected to a single adder.

3. Apparatus for determining the direction of propagation of a plane wave as recited in claim 2, further comprising a plurality of multiplexers equal in number to the number of adders, the outputs of groups of said coders being connected to the inputs of said multiplexers and the output of each of said multiplexers being connected to a corresponding adder, said timing means being connected to each of said multiplexers for controlling the transfer of the output signals of groups of detectors to the adders.

* * * * *